United States Patent [19]
Schleifstein et al.

[11] Patent Number: 5,580,657
[45] Date of Patent: Dec. 3, 1996

[54] DURABLE POLYMERIC DEPOSITS ON INORGANIC MATERIAL SUBSTRATE

[75] Inventors: Robert A. Schleifstein, Edison; Edward Smith, Jr., East Rutherford, both of N.J.

[73] Assignee: Potters Industries Inc, Carlstadt, N.J.

[21] Appl. No.: 194,071

[22] Filed: Feb. 8, 1994

[51] Int. Cl.$^6$ .................................................. B32B 5/16
[52] U.S. Cl. ...................... 428/406; 428/407; 428/429; 428/441; 428/447; 428/448; 428/451
[58] Field of Search ...................... 428/403, 404, 428/406, 407, 383, 441, 442, 461, 463, 451, 429, 447, 448, 688; 106/802, 816, 285, 901, 903; 252/174.24; 523/201; 525/902

[56] References Cited

U.S. PATENT DOCUMENTS

| | | | |
|---|---|---|---|
| 4,097,405 | 6/1978 | Watts | 252/316 |
| 4,517,243 | 5/1985 | Sinha et al. | 428/336 |
| 4,574,109 | 3/1986 | Laroche | 428/325 |
| 4,888,240 | 12/1989 | Graham et al. | 428/403 |
| 4,937,166 | 6/1990 | Creatura et al. | 430/108 |
| 5,332,767 | 7/1994 | Reisser et al. | 523/209 |
| 5,374,357 | 12/1994 | Comstock et al. | 210/666 |

FOREIGN PATENT DOCUMENTS

WO94/21353  9/1994  WIPO.

*Primary Examiner*—Hoa T. Le
*Attorney, Agent, or Firm*—Curtis Morris & Safford

[57] ABSTRACT

As an article of manufacture, a composite, which comprises in combination an inorganic material substrate, a polymeric agent which is at least partially water-soluble, and a substance binding the polymeric agent to the inorganic material substrate, such that there is a decreased tendency of the agent toward removal from the composite by an aqueous medium; and methods of making and using same.

15 Claims, 1 Drawing Sheet

DURABLE POLYMERIC DEPOSITS ON INORGANIC MATERIAL SUBSTRATE

FIELD OF THE INVENTION

This invention generally relates to the deposition of a polymeric agent which is at least partially water-soluble on an inorganic material substrate in such manner that the agent's resistance to removal by an aqueous medium is improved. In certain of its specific aspects, the present invention is well suited for applying coatings containing carboxylated functional groups onto small particles (e.g., glass spheres) to obtain composite particles. Coatings in accordance with the invention enhance the maintenance of the polymeric agent (e.g., a resinous material) on the inorganic material substrate. This invention is especially useful in water-clarification applications.

BACKGROUND OF THE INVENTION

Polymeric agents are commonly bonded to inorganic material substrates, such as glass beads, to facilitate the chemical or physical interaction of the agent with one or more other species to which the agent is subsequently exposed. Presentation of the polymeric agent on the substrate increases the amount of the agent exposed for interaction, and confers mechanical strength and other properties desirable for typical reaction conditions, for instance, column operation.

However, a number of polymeric agents—prominently including various ion-exchange materials—cannot conveniently be bonded to an inorganic material substrate via a direct, chemical link which is hydrophobic, and thus—when deposited on the substrate—are not resistant to the solubilizing action of an aqueous medium such that the polymeric agent remains on the substrate when in contact with such medium. Although such a bonding to the inorganic material substrate is possible, it is impractical and extraordinarily expensive because such a process generally involves placing the monomers on the substrate, polymerizing the monomers and then subjecting same to a harsh sulfonation.

It would be a substantial advance to provide a composite comprising an inorganic material substrate with a polymeric agent made up of polycarboxylated materials (or other polymeric material which tends to be removed by contact with an aqueous medium) held thereon by a binding substance such that the polymeric agent is rendered resistant to removal when the composite is in contact with an aqueous medium.

OBJECTS OF THE INVENTION

It is thus an object of the invention to provide an article of manufacture comprising an inorganic material substrate and bound thereto, in a manner which confers improved resistance to removal by an aqueous medium, a polymeric agent which is at least partially water-soluble.

It is another object of the invention to provide, as an article of manufacture, a free-flowing multiplicity of composite particles, each of which comprises an inorganic material particle having bound thereto, in a manner which confers improved resistance to removal by an aqueous medium, a polymeric agent which is at least partially water-soluble.

A further object of the invention is to provide a method for forming such article of manufacture.

SUMMARY OF THE INVENTION

In one aspect, the invention is an article of manufacture constituting a composite which comprises in combination an inorganic material substrate, a polymeric agent which is at least partially water-soluble, and a substance binding the polymeric agent to the inorganic material substrate, such that there is a decreased tendency of the polymeric agent toward removal from the composite by an aqueous medium.

In yet another aspect, the invention is a multiplicity of composite particles, each of the particles comprising in combination an inorganic material core, a polymeric agent which is at least partially water-soluble, and a substance binding the polymeric agent to the inorganic material core, such that there is a decreased tendency of the polymeric agent toward removal from the composite particle by an aqueous medium, the multiplicity of particles being free-flowing.

In still another aspect, the invention is directed to a method of forming a composite, which comprises the steps of combining an inorganic material substrate with a polymeric agent which is at least partially water-soluble, or one or more precursors of such agent, and with a substance for binding the agent to the substrate, or one or more materials capable of forming said substance, and curing said binding substance or said one or more materials to form the binding substance such that there is a decreased tendency of the agent toward removal from the composite by an aqueous medium.

In another aspect, the invention is directed to a method of performing ion exchange, which comprises contacting an aqueous medium with a multiplicity of articles of manufacture, each such article of manufacture being a composite comprising an inorganic material substrate, a polymeric agent having ion exchange capability which is at least partly water soluble, and a substance binding the polymeric agent to the inorganic material substrate, such that there is a decreased tendency of the agent toward removal from the composite by the aqueous medium.

The invention confers substantial benefits on its practitioner. A principal advantage is the improvement in resistance to removal of the polymeric agent by an aqueous medium. As a result, the composite of the invention is rendered particularly useful in applications requiring contact with, and especially immersion in, an aqueous medium. This is of prime importance, for example, in water clarification operations. For instance, the composite of the present invention would function much the same as an ion-exchange resin in connection with water clarification, but the results would be improved because of the more favorable resistance to removal of the polymeric agent by an aqueous medium with which the aqueous medium is in contact. Furthermore, it is a significant advantage of the invention that a multiplicity of composite particles in accordance with the invention is free-flowing, rather than tending to clump or otherwise agglomerate due to retained moisture, tackiness, or the like.

Various other objects, features and advantages of the invention will be readily apparent from the following description of the invention, when read with reference to the accompanying figures.

DETAILED DESCRIPTION OF CERTAIN PREFERRED EMBODIMENTS OF THE INVENTION

Figure 1:
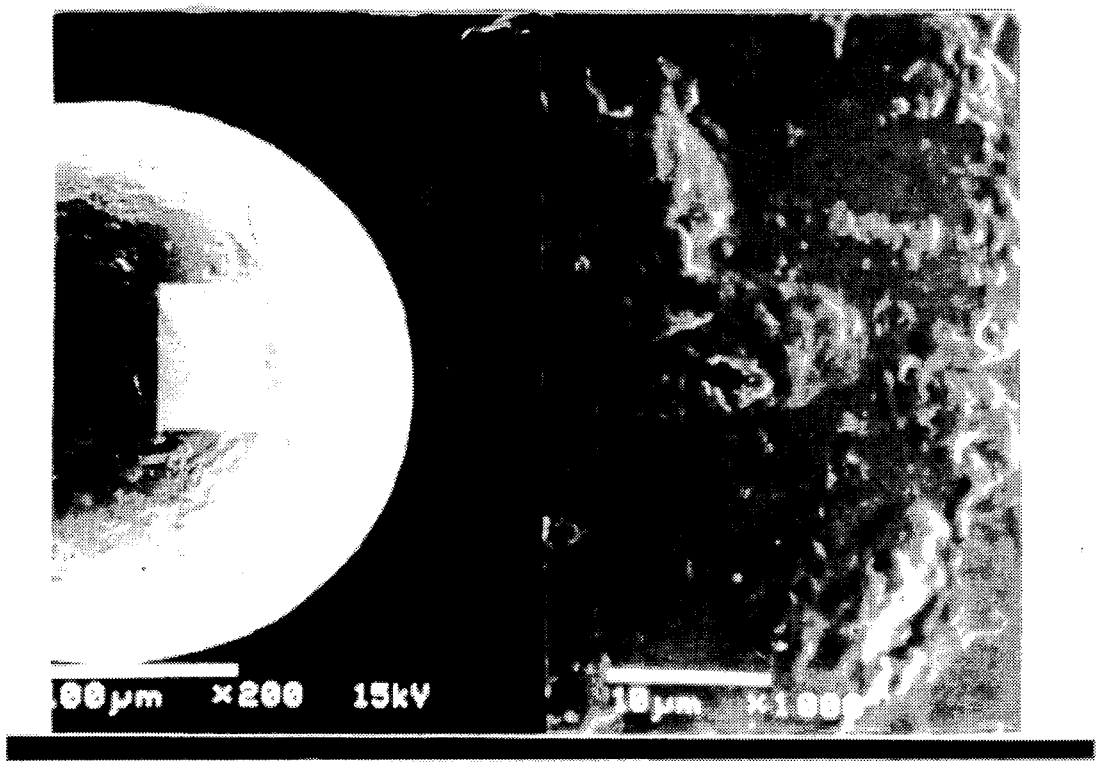
FIG. 1 depicts a scanning electron micrograph (hereinafter sometimes "SEM") of composite particles according to the invention.

It is a central feature of the present invention that the substance utilized to bind the polymeric agent to the inorganic material substrate confers an improved resistance to removal of the agent by an aqueous medium with which the composite is in contact. It will be appreciated that this does not mean exclusively that the polymeric agent's actual water-solubility is decreased per se, as such decrease may not occur. Rather, it refers more broadly to the condition in which the incorporation of the binding substance effects a decreased tendency toward removal of the polymeric agent by the solubilizing and/or other action (e.g., physical action) of the aqueous medium, whatever the mechanism (even if the polymeric agent's water solubility per se remains the same). In addition to any decrease in the water-solubility per se of the polymeric agent which may occur, this condition can, for instance, be a consequence of: a chemical bonding of the binding substance to the inorganic material and/or the polymeric agent; a physical entrapment or encasement or other holding of the polymeric agent by the binding substance such that the agent is maintained in association with the inorganic material substrate; or some combination of the foregoing.

The binding substance, in combination with the polymeric agent, typically forms a film or coating on the substrate, the effect of which is to hold such agent on such substrate while still leaving the agent functionally exposed to its environment so that interaction with one or more other species can occur. In certain embodiments the binding substance and polymeric agent are in intermixture with one another and, after curing to cause hardening of the binding substance, form a coating; the polymeric agent is typically dispersed throughout such coating so as to be kept in place against the action of an aqueous medium but still exposed to the environment for interaction. In other embodiments the binding substance is deposited directly on and optionally attaches to the substrate, and the polymeric agent overlies the binding substance and is bonded to and/or otherwise held by it. The binding substance typically covers the inorganic material substrate substantially continuously, but in other embodiments can be discontinuous with the proviso that the substance covers the substrate sufficiently to bind and/or otherwise hold the polymeric agent thereon. The polymeric agent typically is a continuous or discontinuous deposit on the binding substance, or can intermix with the binding substance, so long as the polymeric agent is present in form and amount sufficient for the intended purpose. And, in yet other embodiments, the polymeric agent is deposited directly on and optionally attaches to the inorganic material substrate, and the binding substance or one or more materials capable of forming same are applied on top of the polymeric agent. The binding substance typically intermixes with the polymeric agent, or takes other forms on the substrate, such as discontinuous deposits which overlie the polymeric agent, so as to hold the agent in place, as long as the attainment of the invention's objectives and advantages are not compromised. In a number of good embodiments, a combination of two or more of the foregoing conditions exists.

The binding substance can be any suitable material for effecting an increased resistance to removal of the polymeric agent by an aqueous medium, whatever the mechanism, as long as the binding substance does not have any appreciably detrimental effect on the interaction of the polymeric agent with its environment or other intended activity. Typically, the binding substance is a material having a high carboxyl functionality and a relatively low molecular weight. Examples are polycarboxylated polymers (i.e., acrylic acid, carboxylated styrene and carboxylated butadiene). The present invention can be practiced by applying a binding substance, or by applying one or more materials capable of forming same, to form the coating or other deposit.

The binding substance of this invention can be an emulsion or suspension polymeric polymer. For example, suitable binding substances include polyvinyl acetate, styrene butadiene, acrylonitrile butadiene styrene, polyvinyl chloride and copolymers thereof.

Some examples of other binding substances are SBR (styrene butadiene rubber) latex (available from Arco Chemical Co.), acrylic VA (polyvinyl acetate/acrylic polyvinyl) copolymer (available from BASF and National Starch), and PVC (polyvinyl chloride) latex (available from Chisso Inc. and Geon Corp.). Generally, all of these examples of binding substances have high molecular weights and are film formers. PVC polymers, however, will require an additional polymer or plasticizer to form film.

The binding substance is preferably an acrylic ester polymer, such as an acrylic latex, that is a hard coating, which in turn results in lower tackiness and greater abrasion resistance (the abrasion resistance of the latex coating is directly proportional to the stiffness of the polymer). The lower the alcohol group, the harder the coating obtained.

Acrylic ester polymers of the generic formula are suitable. The nature of the "R" group determines the properties of each ester and the polymers it forms, with "n" being at least 20, and preferably at least 2000. Advantageously, R is $C_mH_{2m+1}$ wherein m is from 0 to 8. Acrylic monomers have been shown to be versatile building blocks. Hence, polymers designed to fit specific application requirements can be tailored from these versatile monomers.

In certain good embodiments of the invention, the binding substance is selected from the group consisting of copolymers containing acrylics. This is advantageous in some applications because, due to their comparatively low glass transition temperatures, acrylics in copolymers tend to serve as permanent plasticizers for harder monomers.

The binding substance of this invention can also be formed from a reactive silicone. The reactive silicone should contain 1 to 12½% —SiOH by weight. Examples of these include Z6018, QP8-5314, Dow Corning 804 and Dow Corning 805 (all available from Dow Corning Corp.). The reactive silicone can form a product useful as a binding substance alone or in combination with an emulsion or suspension polymeric polymer as aforesaid. In certain good embodiments of the invention, various alkoxy functional silicones are suitable, including methoxy and ethoxy silicone.

For example, when utilizing QP8-5314 reactive silicone and an emulsion or suspension polymeric material in combination, the binding substance comprises a silicone resin combined with the existing emulsion or suspension particles, to produce a copolymer. For its part, the polymerization reaction for forming the silicone resin proceeds as set forth below, with methanol liberated as a byproduct:

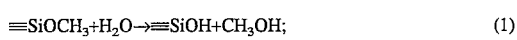
(1)

(2)

The resulting silicone resin is primarily silanol functional with some original methoxy functionality still preserved. As can be seen, a silanol species is reacted with another silanol species by cross-linking in the resin; silanol species can also, or alternatively, attach to the inorganic material substrate (in the event the substrate contains silanol functions available for such reaction and the binding substance can access the surface of the substrate). Thus, there are a plurality of possible steps for forming $\equiv$SiOSi. One is through a condensation reaction of two $\equiv$SiOH species resulting from the reaction of equation (1) above. Another step is through the reaction of $\equiv$SiOH with the surface of the substrate itself, which also includes $\equiv$SiOH. When reactive silicone is used with another polymerizable material, such as thermosetting acrylics containing a methylolated polymer, condensation occurs during heating.

For the purpose of this invention, binding substances in the form of non-tacky films are preferable, in order to produce free-flowing powder. This is one reason acrylic copolymers are a preferred binding substance; their tendency for self-cross-linking leads to non-tacky films. For example, the introduction of N-methylol acrylamide, which is a good cross-linker, produces a favorably non-tacky film that in turn reduces tackiness in the resulting product.

The polymeric agent of this invention is any polymeric substance at least partially water-soluble which the practitioner seeks to present to a selected environment for interaction, or otherwise to deposit on a substrate as aforesaid. The polymeric agent is, for example, a polyacrylic acid polymer, polyacrylic acid copolymer or a salt of a polacrylic acid polymer or copolymer, which forms a hard, glassy coating. It is infinitely soluble in water but insoluble in most organic solvents.

While the category of suitable polymeric agents encompasses a plethora of materials within the broadly defined category, especially interesting types are polymeric materials (such as resins) having carboxyl or sulfonated groups. The manufacture of such materials typically involves one or more of a variety of conventional processes including the preparation of a cross-linked copolymer by suspension polymerization or sulfonation of a double bond or ring. As will be recognized by those skilled in the art, polymeric agents having these carboxylated side chains or sulfonated groups, for instance, the aforementioned resins, are often employed as ion-exchange agents, and thus the invention lends itself to water clarification (e.g., water filtration) applications in general, especially ones in which carboxylation is the method of water clarification.

The present invention can be practiced with pre-formed polymeric agents such as carboxylated polyacrylic acid (i.e., by applying an already formed polymer to the substrate), or alternatively by polymerizing a precursor or precursors of the polymeric agent (such as a carboxylated acrylic monomer, e.g., acrylic acid, ethyl acrylate monomer, N-methylol acrylamide) in situ on the substrate, optionally with a catalyst.

The inorganic material substrate can be any suitable shape and size adapted to the particular application, but often is a particle, such as a bead, flake, multi-faceted object or the like. The term "particle" as used herein refers to a small quantity of matter which can be spherical or irregular in shape. The substrate can be fashioned of any suitable material, such as a mineral substance, but is preferably vitreous. Examples of suitable vitreous materials are soda lime or borosilicate glass (e.g., pyrex).

For the purpose of this invention, inorganic material particles (e.g., glass beads) ranging in maximum dimension from 1 micron (μm) to 5 millimeters (mm) are preferred. More preferred are particles ranging from about 2 μm to 800 μm in maximum dimension. The most preferred particle sizes range from about 250 μm to 350 μm maximum dimension.

The polymeric agent and binding substance are present in amounts, relative to the amount of inorganic material, sufficient to effect the desired interaction with the environment or species (or other desired event or condition) in the case of the polymeric agent, and to effect a decreased tendency of the polymeric agent to removal by an aqueous medium in the case of the binding substance. The composite of the invention (for example, the composite particle, such as a glass bead in combination with polymeric agent and binding substance), contains the polymeric agent, for example, in the form of a coating on the substrate, in an amount of from 0.1–2.0% of the weight of the inorganic material. Further, the composite preferably contains the binding substance in an amount of from 0.01–1.0% of the weight of the inorganic material, more preferably 0.10–0.5% of the weight of the inorganic material. However, those skilled in the art will appreciate that the relative amounts of inorganic material, polymeric agent, and binding substance are empirically determined and that in certain embodiments the amounts of the foregoing materials can be varied outside such preferred ranges to secure the benefits conferred by practice of the invention, without undue experimentation.

The combination of the polymeric agent and binding substance with the inorganic material substrate may be a one-step or two-step process. In the one-step process, the polymeric agent (or one or more precursors thereof) and one or more materials capable of forming the binding substance are co-applied onto the inorganic material substrate prior to curing. In the two-step process, either (1) the polymeric agent (or precursor(s) thereof) is first applied (and then dried by heating, preferably) and then the binding substance or material(s) capable of forming same are applied, or (2) the binding substance or material(s) capable of forming same are first applied and then the polymeric agent (or precursor(s) thereof) is applied—in each case, the composite thereafter being cured to impart the improvement in resistance to removal of the agent by an aqueous medium.

A thickener can be incorporated to reduce the amount of polymeric agent (or precursor(s) thereof) used. Ammonium hydroxide is frequently used with the acrylic polymer because the two are compatible and because thickening effects are reversible with ammonium hydroxide. Other thickeners, such as cellulose gums, alginates and synthetic swelling agents can also be employed. The thickener enables the polymeric agent (or precursor(s)) to cling to the substrates more effectively, hence enabling the polymeric agent (or precursor(s)) to stay in place during processing. Moreover, the addition of a thickener ensures heavier and more uniform coverage when lower amounts of the polymeric agent (or precursor(s)) and binding substance (or material(s) capable of forming the binding substance) are used.

Additionally, when lesser amounts of polymeric agent (or precursor(s)) and binding substance or material(s) for forming same are used, pre-wetting the substrate will aid in more uniform coating. The substrate is preferably pre-wetted prior to application of the binding substance or material(s) for forming same and/or polymeric agent (or precursor(s)).

Pre-wetting can be performed using a surfactant. Various types of surfactants are suitable, the identification of which is suitable for any particular set of materials and conditions being empirical, and capable of determination by those ordinarily skilled in the art without undue experimentation.

Typically, a surfactant may have the formula

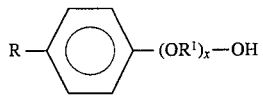

wherein R is hydrogen or $C_nH_{2n+1}$, $R^1$ is $C_nH_{2n}$, x is 0 to 70 and n is from 1 to 20. Preferably, n is from 6 to 10. Specific examples are a substance available in commerce under the name Triton X-100, of the formula

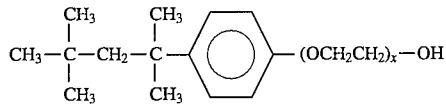

wherein x is 9–10, and a substance available in commerce under the name Triton N-401 (NPE-40), of the formula

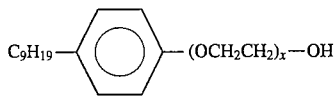

wherein x is 40. The surfactant can be added to water, causing the water to penetrate more easily and to spread over the surface of the substrate prior to treatment with the polymeric agent (or precursor(s)) and the binding substance (or material(s) capable of forming same). The substrate is pre-wetted with water in an amount desired, preferably of from 0.025–0.75% of the weight of the inorganic material, more preferably 0.05% of the weight of the inorganic material. The preferred amount of surfactant is from 0.000005–0.00005% of the weight of the inorganic material. However, it will be appreciated by those of ordinary skill in the art that the relative amounts of water and surfactant can vary outside such ranges in some embodiments, the determination of same being empirical in nature and within the competence of the ordinarily skilled worker (without undue experimentation).

Typically, the inorganic material substrate (e.g. particles), as well as water and a surfactant, are mixed together in a tumbler, rotary mixer, or the like; the polymeric agent (or precursor(s) thereof) and binding substance (or material(s) capable of forming same are then added together or sequentially as desired (it is noted that other mixing apparatus which is capable of effectively administering these components is suitable). The amounts of polymeric agent (or precursor(s) thereof) and binding substance (or material(s) capable of forming same) are sufficient to yield amounts of the polymeric agent and binding substance components in the composite falling within the guidelines disclosed in preceding paragraphs.

The curing operation involves heating the composite of substrate/polymeric agent (or precursor(s))/binding substance (or formative material(s)) at a temperature in the range from 50° C. to 95° C. for a time of from 10 to 30 minutes. If required, additional cross-linking can be obtained by heating the coated dried particles at a temperature up to and including 150° C. for from 5 to 15 minutes. If desired, catalysts as recommended by the resin manufacturers can be used to facilitate curing. Exposure of the materials to a temperature of at least 50° C. in connection with curing also has the highly beneficial result that the coating of each of the composite particles becomes dry and hard such that a multiplicity of the particles is free-flowing.

It is also advantageous in certain embodiments of the invention, especially those in which the polymeric agent (or precursor(s) thereof) is applied before the binding substance (or material(s) capable of forming same), to subject the inorganic material and components thereon to a pre-cure or drying step. This typically comprises heating to a temperature in the range from 50°–95° C. for a time from 10–30 minutes.

As a test to determine the extent to which the tendency of the polymeric agent toward removal is decreased with the invention (and as a measure of ion-exchange capability in such applications), a dye screening test can be employed using a polyacrylic acid indicator (such as 1% Crystal Violet by weight in methanol) (hereinafter the "Crystal Violet test"). For substrates on which a binding substance has not been deposited in accordance with the invention, washing after treatment with the indicator results in loss of the purple color on the substrate since the indicator has not been attached to the polymeric agent. The preferred products are coated substrates which retain the uniform purple color after washing with running water.

Figure 2:
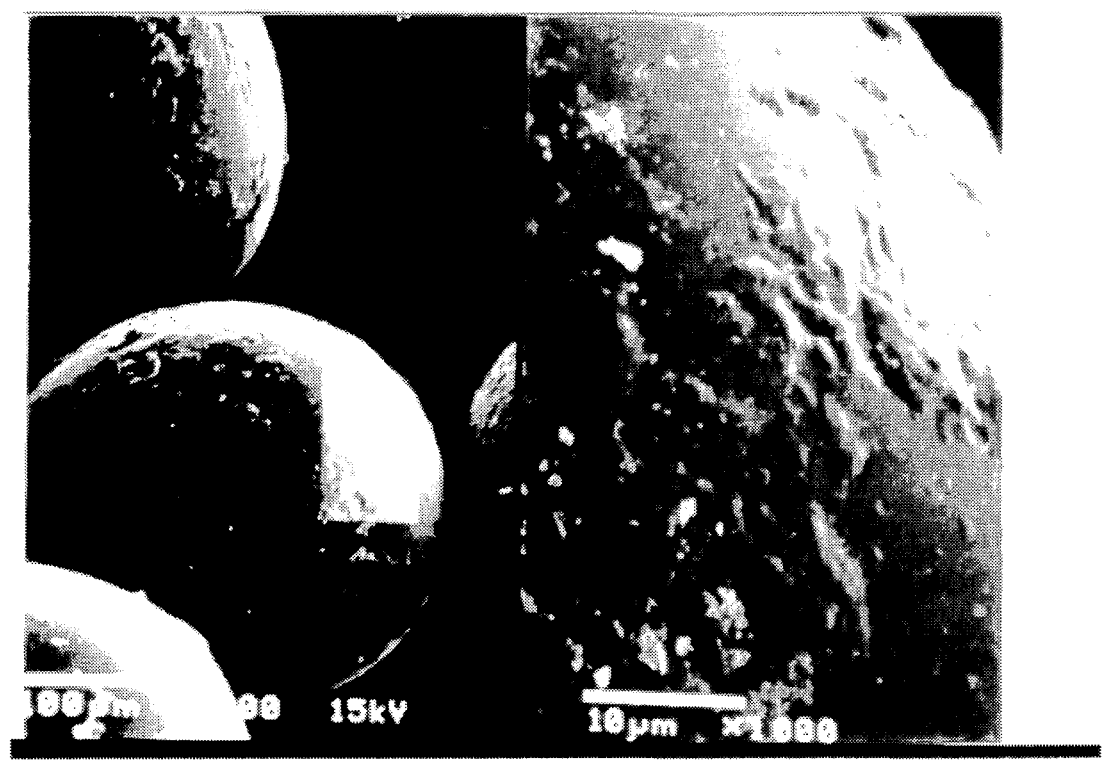
FIG. 2 similarly depicts a scanning electron micrograph of composite particles according to the invention.

The durability of the polymeric agent on the substrate in accordance with this invention is shown by the drawings. FIG. 1 is a SEM of composite particles according to this invention which have not been used for water treatment. FIG. 2 is a SEM of the composite particles according to this invention after being used for water filtration for 600 hours. A comparison illustrates that only insignificant changes take place in the particles after prolonged water treatment usage.

In a preferred aspect, the invention is a composite particle which comprises, in combination an inorganic material core, a polymeric agent which is at least partially water-soluble, and a substance binding the polymeric agent to the inorganic material core such that there is a decreased tendency of the polymeric agent toward removal from the composite particle by an aqueous medium.

Yet another aspect of the invention is directed to a substantially free-flowing composition, which comprises a plurality of core particles of inorganic material, and deposited on the core particles a polymeric agent which is at least partially water-soluble in combination with a substance binding the agent to the core particles such that there is a decreased tendency of the polymeric agent toward removal from the composition by an aqueous medium.

In another aspect, the invention is directed to a method of forming a composite, which comprises the steps of treating a particle of inorganic material with a water-surfactant mixture, combining the treated particle with a polymeric agent that is at least partially water-soluble, or one or more precursors of such agent, and with a substance for binding the agent to the particle, or one or more materials for forming such substance, and curing the binding substance or material or materials for forming same such that a coating containing said polymeric agent is formed and there is a decreased tendency of the polymeric agent toward removal therefrom by an aqueous medium.

Further objects of this invention, together with additional features contributing thereto and advantages accruing therefrom, will be apparent from the following examples of the invention (in the examples the term "polymeric agent" includes a precursor or precursors of same, and the term "binding substance" includes a material or materials for forming same).

EXAMPLE 1

One kilogram of P0140 glass beads (45–60 U.S. mesh) (inorganic material) was charged into a clean stainless steel tumbler. Tumbling of the beads was begun without heating.

The inorganic material was wetted with 0.05% owg (on weight of glass) deionized water.

A silicone based binding substance (commercially available under the name QP8-5314 Intermediate from Dow Corning Corporation, Midland, Mich.) was slowly added to the tumbler's contents over several minutes using a 0.05% owg solution.

The beads were then treated with a 0.2% owg polyacrylic polymeric agent (commercially available under the name Rhoplex B-74 Emulsion from Rohm and Haas Company, Philadelphia, Pa.) by slow addition of the polymeric agent to the tumbler's contents.

The beads treated as mentioned above were subsequently pre-cured at a temperature of about 90° C. for about 20 minutes and then post-cured at about 150° C. for 20 minutes. The resultant beads were homogeneously coated with a smooth and even coating containing the polyacrylic material.

EXAMPLE 2

One kilogram of P0140 glass beads were pre-wetted with 0.05% owg deionized water. The beads were then treated with 0.1% owg Rhoplex B-74 Emulsion followed by 0.1% owg binding substance (commercially available under the name UCAR Latex 163 from the Union Carbide Corporation, Danbury, Conn.).

The beads treated as mentioned above were subsequently cured at a temperature of about 90° C. for about 20 minutes and then post-cured at about 150° C. for 20 minutes.

EXAMPLE 3

One kilogram of P0140 glass beads were treated by the coapplication of the polymeric agent and the binding substance of in Example 2. Curing conditions were the same as in Example 2.

The beads treated as mentioned above were subsequently cured at a temperature of about 90° C. for about 20 minutes and then post-cured at about 150° C. for 20 minutes.

EXAMPLE 4

P0140 glass beads were pre-wetted with 0.05% owg deionized water. The beads were then treated with 0.25% owg Rhoplex B-74 followed by 0.025% UCAR 163 thickened to 2000 cp of ammonium hydroxide prior to application to the glass beads.

The beads were then cured at a temperature of 80°–90° C. over a period of about 20–25 minutes.

COMPARATIVE EXAMPLE 5

One kilogram of 20–80 U.S. mesh size glass beads was pre-wetted with 0.2% owg deionized water and 0.01% owg Triton X-100. The wetted beads were then treated with 0.2% owg Rhoplex B-74 Emulsion followed by subsequent curing at 80° C. for 20–25 minutes. On contact with water, the Rhoplex B-74 Emulsion coating came off the bead, as demonstrated by the fact that the Crystal Violet test showed no violet dye retention.

COMPARATIVE EXAMPLE 6

One kilogram of 20–80 U.S. mesh size glass beads was pre-wetted with 0.2% owg deionized water and 0.01% owg Triton X-100 solution. The wetted beads were then treated with 0.01% owg Z-6040 organo-silane (commercially available under the name Z6040 from the Dow Corning Corporation, Midland, Mich.), and thereafter with 0.2% owg Rhoplex B-74 Emulsion. After drying at 80° C. for 20–30 minutes, the resultant bead had a durable coating, but with non-uniform coverage.

EXAMPLE 7

A polymeric agent was deposited on glass beads using a carboxylated binding substance in a two-step application. Glass beads were pre-wetted with 0.05% owg deionized water followed by application of the indicated amount of polymeric agent (Rhoplex B-74), carboxylated binding substance (UCAR 163) and ammonium hydroxide (Examples 7C and 7D).

| Example 7A | 0.2% owg Rhoplex B-74; 0.025% owg UCAR 163 |
| --- | --- |
| Example 7B | 0.5% owg Rhoplex B-74; 0.05% owg UCAR 163 |
| Example 7C | 0.5% owg Rhoplex B-74; 0.05% owg UCAR 163; 1 drop ammonium hydroxide |
| Example 7D | 0.2% owg Rhoplex B-74; 0.025% owg UCAR 163; 1 drop ammonium hydroxide |

EXAMPLE 8

A polymeric agent was deposited on glass beads using a carboxylated binding substance in a one-step application. Glass beads were pre-wetted with 0.05% owg deionized water, followed by application of the indicated amount of polymeric agent (Rhoplex B-74), carboxylated binding substance (UCAR 163) and ammonium hydroxide (Example 8C), in combination.

| Example 8A | 0.2% owg Rhoplex B-74; 0.025% owg UCAR 163 |
| --- | --- |
| Example 8B | 0.5% owg Rhoplex B-74; 0.05% owg UCAR 163 |
| Example 8C | 0.5% owg Rhoplex B-74; 0.05% owg UCAR 163; 1 drop ammonium hydroxide |

Based on Crystal Violet testing of the products for Examples 7A to 7D and 8A to 8C, the relative improvements in resistance to removal of the polymeric agent was indicated to be as follows:

7B>7C>8B>7D=8C=8A>7A

EXAMPLE 9

A polymeric agent was deposited on glass beads using a silicone binding substance in a two-step application. Glass beads were pre-wetted with 0.05% owg deionized water, followed by application of the indicated amount of polymeric agent (Rhoplex B-74), and silicone binding substance (QP8-5314).

| Example 9A | 0.2% owg Rhoplex B-74; 0.025% owg QP8-5314 |
| --- | --- |
| Example 9B | 0.5% owg Rhoplex B-74; 0.05% owg QP8-5314 |

EXAMPLE 10

A polymeric agent was deposited on glass beads using a silicone binding substance in a one-step application. Glass beads were pre-wetted with 0.05% owg deionized water, followed by application of the indicated amount of polymeric agent (Rhoplex B-74) and silicone binding substance (QP8-5314).

| Example 10A | 0.2% owg Rhoplex B-74; 0.05% owg QP8-5314 |
|---|---|
| Example 10B | 0.05% owg Rhoplex B-74; 0.05% owg QP8-5314 |

Based on Crystal Violet testing of the products for Examples 9A, 9B, 10A and 10B, the relative improvements in resistance to removal of the polymeric agent was indicated to be as follows:

10A>9A>>9B>10B

It will be appreciated that variations and modifications to the products and methods can be made by the skilled person without departing from the spirit or scope of the invention as defined in the appended claims.

What is claimed is:

1. As an article of manufacture, a composite which comprises in combination:
   an inorganic material substrate;
   a polymeric agent which is water-soluble to any degree and has carboxyl or sulfonic acid side chain groups; and
   a polymeric substance binding said polymeric agent to the inorganic material substrate, wherein the binding substance is formed from a reactive silicone or a reactive silane, comprises an emulsion or suspension polymer, or is an acrylic latex, or mixtures thereof, such that there is an improved resistance to removal of the agent from the composite by an aqueous medium as compared to a composite without said polymeric binding substance.

2. A composite as defined in claim 1, wherein the inorganic material substrate comprises a vitreous material.

3. A composite as defined in claim 2, wherein the substrate is a vitreous particle.

4. A composite as defined in claim 3, wherein the vitreous particle is a glass bead.

5. A composite as defined in claim 4, wherein the vitreous particle is a bead of size from 1 µm to 5 mm.

6. A composite as defined in claim 1, wherein the polymeric agent is a homo- or copolymer of acrylic acid.

7. A composite as defined in claim 1, wherein the polymeric agent is a salt of a homo- or copolymer of acrylic acid.

8. A composite as defined in claim 1, wherein the binding substance is formed from a reactive silicone.

9. A composite as defined in claim 1, wherein the binding substance comprises an emulsion or suspension polymer.

10. A composite as defined in claim 1, wherein the binding substance is an acrylic latex.

11. A composite as defined in claim 10, wherein the acrylic latex is a material of the formula

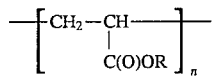

wherein n is at least 20 and R is $C_mH_{2m+1}$ and wherein m is from 0 to 8.

12. A composite as defined in claim 1, wherein the polymeric agent is infinitely soluble in water.

13. A composite particle which comprises, in combination:
   an inorganic material core;
   a polymeric agent which is water-soluble to any degree and has carboxyl or sulfonic acid side chain groups; and
   a polymeric substance binding the polymeric agent to the inorganic material core, wherein the binding substance is formed from a reactive silicone or a reactive silane, comprises an emulsion or suspension polymer, or is an acrylic latex, or mixtures thereof, such that there is an improved resistance to removal of the agent from the composite particle by an aqueous medium as compared to a composite particle without said polymeric binding substance.

14. A multiplicity of composite particles, each of the particles comprising, in combination:
   an inorganic material core;
   a polymeric agent which is water-soluble to any degree and has carboxyl or sulfonic acid side chain groups; and
   a polymeric substance binding the polymeric agent to the inorganic material core, wherein the binding substance is formed from a reactive silicone or a reactive silane, comprises an emulsion or suspension polymer, or is an acrylic latex, or mixtures thereof, such that there is an improved resistance to removal of the polymeric agent from the composite particles by an aqueous medium as compared to particles without said polymeric binding substance;
   said multiplicity of particles being free-flowing.

15. A substantially free-flowing composition, which comprises a plurality of core particles of inorganic material, and deposited on said core particles a polymeric agent which is water soluble to any degree and has carboxyl or sulfonic acid side chain groups, in combination with a polymeric substance binding said agent to said core particles, wherein the binding substance is formed from a reactive silicone or a reactive silane, comprises an emulsion or suspension polymer, or is an acrylic latex, or mixtures thereof, such that there is an improved resistance to removal of the agent from the composition by an aqueous medium as compared to a composition without said polmeric binding substance.

* * * * *